2,900,293

PROCESS FOR THE PREPARATION OF FUNGICIDES, BACTERICIDES, INSECTICIDES AND MICROBICIDES

Lawrence Herbert Nash, Belle Glade, Fla.

No Drawing. Application July 12, 1954
Serial No. 442,921

2 Claims. (Cl. 167—22)

This invention relates to the manufacture of new compositions of matter, their use as an insecticide, microbicide, bactericide and fungicide, and more specifically directed to uses of these compositions as an essential active ingredient in admixture with a carrier.

The object of this invention is to provide a new and improved fungicidal, bacterial, microbial and insecticidal composition in such a combination that it is insoluble in water but in suitable condition to be applied as a spray or powder, emulsion, suspension or liquid form.

Another object of this invention is to produce a fungicide, microbicide, bactericide and insecticide that is substantially non-toxic to either human or animal life and non-injurious to plant life when used as directed hereinafter.

Another object of this invention, to provide the means to inhibit and prevent the attacks of fungus on fruits, vegetables, wood, fabrics, leather, paints and other organic materials. These objects are accomplished by treating plants or objects to be protected with an organic material of my invention in either a liquid, emulsion, suspension or powdered form.

The new compositions of matter disclosed by this invention are metallic ammonium alkyl xanthates and particularly manganese ammonium methyl xanthate and zinc ammonium methyl xanthate. The method of manufacture consists broadly of reacting ammonium hydroxide with an anhydrous mixture of an alcohol and a base in carbon disulfide followed by processing the liquid product on a water soluble metallic salt in solid anhydrous state to form the metallic ammonium alkyl xanthates.

In the first step of my process, an anhydrous alcohol is reacted with carbon disulfide and an alkali metal hydroxide and ammonium hydroxide to form an alkali metal ammonium alkyl xanthate. The alkali metal and the ammonium may be present in the same molecule or in different molecules so that a mixture of products results. It should be noted less than a stoichiometric quantity of the alkali metal hydroxide and ammonium hydroxide are present with respect to the alcohol.

In any case, a stable clear fluid results as pointed out in the example.

It should be noted that in the prior art a reaction of alcohol, carbon disulfide and large quantities of alkali metal hydroxide have been carried out but these usually required a considerable length of time and heat to dissolve the alkali metal hydroxide. In my process the reaction goes very quickly and violently as soon as the ammonium hydroxide is added. No heat is required.

The second step of my process is carried out by adding the fluid resulting from the first step, to an anhydrous water soluble metallic salt, preferably manganese salt, resulting in a solid product which is immediately reduced to an extremely fine state. Preferably manganese and zinc salts are used.

An important advantage of the product of my invention is that a greater concentration of it can be used as an insecticide or fungicide without burning or hurting the plant. A greater concentration of the final product can be used than of the intermediate product, that is, the product of the first step, alkali metal ammonium alkyl xanthate. Also, a greater concentration of the final product can be used than of prior art materials.

Xanthates are usually made by treating an alcohol to form a metal alcoholate and then react the alcoholate with carbon disulfide. It can be either anhydrous or aqueous. Some xanthates are formed by applying heat to the alkali bases and alcohol to form the alcoholate. The use of heat is unnecessary in the process of the present invention.

In the first step of the reaction, typical bases suitable for manufacture of xanthates are sodium, potassium, calcium, barium and lithium hydroxides. Metallic sodium, potassium or anhydrous sodium ethylate can also be used.

Solutions of alkali metal xanthates when treated with water soluble metallic salts undergo reactions forming insoluble metallic xanthates. The final product of reaction is metallic xanthate and the insoluble bis alkyl xanthogen or dixanthogen and perhaps a small amount of impurities. The insoluble materials may be filtered or centrifuged. If further purification is desired, the filtrate can be washed and refiltered.

However, I have found in the agricultural field the small amount of soluble metallic salts are beneficial to plants, particularly the manganese salts. I have found in accordance with my invention that metallic xanthate and dialkyl xanthogen are formed without having the metallic salt in an aqueous solution but rather carrying out the reaction with the metallic salt in an anhydrous solid state as shown in the examples, hereinafter.

Examples 1, 2 and 3 show the first step of the process. Examples 4 and 5 show the second step.

EXAMPLE 1

1000 parts by weight of anhydrous methyl alcohol is mixed with 1150 parts by weight of technical carbon disulfide. The two are stirred for one minute to be sure of miscibility. Then 300 parts by weight of 97% sodium hydroxide is added. The three ingredients are stirred for about three minutes. Continue to stir the solution and add 1000 parts by weight of a 28% ammonium hydroxide solution. The reaction becomes violent. A container at least five times the volume of liquid to be processed should be used due to the violence of the reaction. Air may be blown into the reaction vat to reduce the violence of the reaction. Agitation is continued until the reaction is complete and a clear, cherry red fluid, sodium ammonium methyl xanthate is the product. It is shown by this example.

The manufacture or composition of a xanthate without the use of heat is shown by this example.

EXAMPLE 2

1000 parts by weight of ethyl alcohol is mixed with 1150 parts by weight of technical carbon disulfide and 460 parts by weight of 85% potassium hydroxide. The three ingredients are stirred for three minutes, continuing the agitation and stirring, 1000 parts by weight of 28% ammonium hydroxide is added. The reaction is extremely violent. Air should be blown into the reaction vat to reduce the violence of the reaction. Continue to stir until a clear, cherry red fluid, potassium ammonium ethyl xanthate is the product.

EXAMPLE 3

1000 parts by weight of ethyl alcohol is mixed with 1150 parts by weight of technical carbon disulfide and 300 parts by weight of 97% sodium hydroxide. The three ingredients are stirred for three minutes; continue to stir and add 1000 parts by weight of 28% ammonium hydroxide. The reaction is not as violent as when potassium hydroxide is used. Stirring is continued until a clear, cherry red fluid, sodium ammonium ethyl xanthate is the product.

It should be noted at this point that sodium hydroxide is preferred over potassium hydroxide and other hydroxides due to the reaction rate and the quality of the end product. Particularly, potassium hydroxide gives a very violent reaction as in Example 2 above. The other hydroxides mentioned above are either poisonous or do not give as good quality of the end product as does sodium hydroxide.

The clear, cherry red fluids referred to in Examples 1, 2 and this example, 3, sodium ammonium methyl xanthate, potassium ammonium ethyl xanthate and sodium ammonium ethyl xanthate, respectively, were stored at zero degree centigrade for thirty days. There was no precipitate, clouding or breaking of the fluids.

EXAMPLE 4

The liquid products resulting from the process of Examples 1, 2 and 3 were processed upon a water soluble anhydrous metallic salt such as manganese chloride, manganese sulphate, zinc chloride, zinc sulphate, ferric chloride and ferric sulphate.

This was accomplished by spraying one part by weight of the liquid products upon two parts by weight of the anhydrous metallic salts or dehydrated metallic salt while the metallic salt was being mixed in a ribbon type powder mixer. When the reaction was complete, the powdered material was passed from the ribbon type mixer through a high speed grinder which made the powder free flowing. The particle size of the finished material should not be less than 325 mesh.

The chemicals formed in this dry process were:

From sodium ammonium methyl xanthate:
| | |
|---|---|
| Manganese ammonium methyl xanthate | From manganese chloride. |
| Manganese ammonium methyl xanthate | From manganese sulphate. |
| Zinc ammonium methyl xanthate | From zinc chloride. |
| Zinc ammonium methyl xanthate | From zinc sulphate. |
| Ferric ammonium methyl xanthate | From ferric chloride. |
| Ferric ammonium methyl xanthate | From ferric sulphate. |

From potassium ammonium ethyl xanthate:
| | |
|---|---|
| Manganese ammonium ethyl xanthate | From manganese chloride. |
| Manganese ammonium ethyl xanthate | From manganese sulphate. |
| Zinc ammonium ethyl xanthate | From zinc chloride. |
| Zinc ammonium ethyl xanthate | From zinc sulphate. |
| Ferric ammonium ethyl xanthate | From ferric chloride. |
| Ferric ammonium ethyl xanthate | From ferric sulphate. |

From sodium ammonium ethyl xanthate:
| | |
|---|---|
| Manganese ammonium ethyl xanthate | From manganese chloride. |
| Manganese ammonium ethyl xanthate | From manganese sulphate. |
| Zinc ammonium ethyl xanthate | From zinc chloride. |
| Zinc ammonium ethyl xanthate | From zinc sulphate. |
| Ferric ammonium ethyl xanthate | From ferric chloride. |
| Ferric ammonium ethyl xanthate | From ferric sulphate. |

From these three examples it is readily seen that many combinations can be secured by varying the type of metallic salt. Where a metallic salt is almost anhydrous the material works just as well. Where the metallic salt contains a sizeable quantity of water the metallic salt must be dehydrated in a forced draft type oven. When the metallic salts are dehydrated they are processed the same as the anhydrous materials. From this knowledge the following has been discovered and is a part of this invention.

EXAMPLE 5

Dithiocarbamates, 2-mercaptobenzothiazole, liquid lime sulphur, diaminodiphenylamine and thiuram disulphides, and combinations of these, as well as many other sulphur bearing materials can be processed as explained above, by reacting the liquids directly upon the anhydrous metallic salts, and passing the resulting materials through a grinder to have a free flowing powder of 325 mesh, as stated in Example 4.

Liqiud lime sulphur is made by the combining of calcium polysulphides with other compounds of calcium and sulphurs and are commonly known as lime sulphur. Zinc can be reacted with calcium polysulphides to make a combination zinc liquid lime sulphur which can be treated the same as liquid lime sulphur.

Twenty-four combinations of materials have been made from potassium ethylene bis dithiocarbamate, sodium dimethyl dithiocarbamate, disodium ethylene bis dithiocarbamate and liquid lime sulphur (standard quality) using manganese chloride, manganese sulphate, zinc chloride, zinc sulphate, ferric chloride and ferric sulphate as the metallic salts. The metallic salts were either anhydrous or dehydrated. The following materials were produced by using the method of spraying and grinding as stated above:

*Using potassium ethylene bis dithiocarbamate*

Manganese ethylene bis dithiocarbamate was produced from manganese chloride
Manganese ethylene bis dithiocarbamate was produced from manganese sulphate
Zinc ethylene bis dithiocarbamate was produced from zinc chloride
Zinc ethylene bis dithiocarbamate was produced from zinc sulphate
Ferric ethylene bis dithiocarbamate was produced from ferric chloride
Ferric ethylene bis dithiocarbamate was produced from ferric sulphate

*Using sodium dimethyl dithiocarbamate*

Manganese dimethyl dithiocarbamate was produced from manganese chloride
Manganese dimethyl dithiocarbamate was produced from manganese sulphate
Zinc dimethyl dithiocarbamate was produced from zinc sulphate
Ferric dimethyl dithiocarbamate was produced from ferric chloride
Ferric dimethyl dithiocarbamate was produced from ferric sulphate

*Using disodium ethylene bis dithiocarbamate*

Manganese ethylene bis dithiocarbamate was produced from manganese chloride
Manganese ethylene bis dithiocarbamate was produced from manganese sulphate
Zinc ethylene bis dithiocarbamate was produced from zinc chloride
Zinc ethylene bis dithiocarbamate was produced from zinc sulphate
Ferric ethylene bis dithiocarbamate was produced from ferric sulphate
Ferric ethylene bis dithiocarbamate was produced from ferric chloride

*Using liquid lime sulphur (standard quality)*

Manganese polysulfide was produced from manganese chloride
Manganese polysulfide was produced from manganese sulphate
Zinc polysulfide was produced from zinc chloride
Zinc polysulfide was produced from zinc sulphate
Ferric polysulfide was produced from ferric chloride
Ferric polysulfide was produced from ferric sulphate

EXAMPLE 6

Manganese ammonium methyl xanthate, as made by the process of Examples 1 and 4 above, was applied on sweet corn for the control of helminthosporium leaf blight in the following manner: A mixture of five parts by weight of manganese ammonium methyl xanthate, five parts by weight of DDT (dichloro diphenyl trichloroethane) and 90 parts by weight of inert carrier (talc) was applied to corn at silking for control of helminthosporium leaf blight and ear worms at 35 pounds per acre. Both were controlled. It was applied at 72-hour intervals.

EXAMPLE 7

Potassium ammonium ethyl xanthate as made by the process of Example 2 and converted to zinc ammonium ethyl xanthate by the Example 4, was used on yellow crookneck squash for control of black mold (alternaria cucumerina), at one and one half pounds zinc ammonium ethyl xanthate in 100 gallons of water, at weekly intervals, wetting the plant thoroughly. Fish oil soap was used as a wetting agent. Control of the disease was perfect.

EXAMPLE 8

Sodium ammonium ethyl xanthate as made by the process of Example 3 and converted to manganese ammonium ethyl xanthate by the process of Example 4 was used on Tendergreen Bush Beans for control of bean rust (uromyces phaseoli) with exceptionally good results. Manganese ammonium ethyl xanthate 5 parts by weight, manganese sulphate 5 parts by weight and dusting sulphur 90 parts by weight were applied at seven day intervals at 25 pounds per acre. The control of rust was very good. It was noticed that the bean leaf roller was very conspicuously absent from this field of beans.

EXAMPLE 9

Manganese ammonium methyl xanthate as processed from Example 4 from manganese sulphate was used on the following vegetables for the control of the disease shown opposite the vegetable. It was used at one and one-half pounds of manganese ammonium methyl xanthate to 100 gallons of water at five day intervals, wetting the plant thoroughly. Two ounces of polyoxyethylene sorbitol esters of mixed fatty and resin acids was used as the wetting agent.

| Vegetable | Disease |
| --- | --- |
| Potatoes | Early and Late Blight. |
| Celery | Cercospora and Septoria Leaf Blights. |
| Tomatoes | Early and Late Blight, Leaf Spots. |
| Cabbage | Powdery Mildew, Cercospora leaf spot, Downy Mildew and Southern Blight. |
| Peaches | Brown Rot, Peach Leaf Curl, Scab. |
| Escarole | Southern Blight. |

In the testing on peaches, the material was a 1% Parathion (O,O-diethyl O-p-nitrophenyl thiophosphate), 5% manganese ammonium methyl xanthate, 80% dusting sulphur and 14% inert material. The curculio and the diseases stated were controlled with weekly applications of 20 pounds per acre.

EXAMPLE 10

The twenty-four chemicals produced by the process of Example 5 were tested on Tendergreen Bush Beans for damage to the plant. At concentrations of strengths up to five pounds per 100 gallons of water, there was no injury or indication of stunting or ill effect from the use of the materials. However, when the liquid products of Examples 1, 2 and 3, and the starting materials of Example 5 were used without processing with a metallic salt, in accordance with Example 5, the damage and injury ranged from slight to death of the plant when used at the same concentration or strength.

From the description of this invention it is readily seen that the combinations of materials possible other than the few alkali bases evolve around the alcohols and metallic salts. A few metallic salts although not preferred, that can also be used in addition to those already stated, are aluminum, barium, calcium, cobaltous, cupric, ferrous, lead, magnesium, mercuric, potassium, silver and sodium.

The alcohols that can be used to form the alcoholate can be from the following group:

Normal monohydric saturated alcohols and their isomers, methyl, ethyl, the two propyls, the four butyls, the seven amyls, as well as all higher alcohols of this series and their isomers;

Fatty alcohols, saturated and unsaturated, (usually $C_nH_{2n+1}OH$) are included, such as lauryl, octadecyl, oleyl, cetyl, ceryl and myricyl;

Monohydric unsaturated alcohols, the alcohols derived from acetylene, and which include propargyl alcohol are also included;

Monohydric, unsaturated alcohols, $C_nH_{2n-1}OH$, including the vinyl and allyl alcohols;

Open chain olefinic terpenes, nerol, geraniol and linalool;

Monocyclic terpenes and camphors, terpin compounds, as well as those of complex cyclic terpenes and camphors as fenchyl alcohol, borneol and terpineol;

Alcohols are also contemplated. These include di-primary, primary secondary, di-secondary, primary tertiary, secondary tertiary and di-tertiary glycols, and specifically ethylene, and propylene, the butylene, the amylene and hexalene glycols as well as tetra methyl-ethylene glycol are mentioned;

Glycols, wherein one of the hydroxyls has been replaced, glycol chlorhydrin, hydroxylethylamine and isethionic acid, respectively set forth as a mineral acid ester, and amine and a sulphurous acid derivative;

Other polyhydric alcohols can be used, and derivatives thereof, as glycerol and derivatives thereof containing one or more hydroxyls as the mono and dichlorhydrins, glycide alcohol and derivatives thereof. Tetra-, penta-, and hexa-hydric alcohols and derivatives can be used as xanthate sources and such alcohols are erythritol, arabitol, mannitol, sorbitol and dulcitol;

Monohydroxy derivatives of the fatty acids as glycollic acid are mentioned as examples although all others are included as well as acid derivatives as sodium glycollate, ethyl glycollate, glycollyl, chloride and glycollamide. Polyhydric monobasic acids as glyceric, arabonic, gluconic, mannonic, gulonic, galactonic and talonic acids;

Hydroxyl aldehydes, aldol and glyceric aldehyde, the dihydroxy dibasic acids, the tartaric acids and polyhydroxy dibasic acids, trihydroxy glutaric acid and the saccharic acids. Hydroxy polybasic acids, citric acid, and derivatives provide xanthate sources;

Hydroxylic derivatives of benzene and its homologues. Thus, starting with a monohydric phenol wherein the hydroxyl is attached to the nucleus as phenol, a cresol, a xylenol, or a higher monohydric phenol, or a homologue having a modified or substituted side chain;

Polyhydric phenols, dihydroxy phenols as catechol and resorcinol, trihydroxy phenols as pyrogallol, phyloroglucinol, hydroxy-quinol;

Aromatic alcohols, those in which the hydroxyl is in the side chain are also useful herein, both saturated and unsaturated, substituted and unsubstituted. Benzyl alcohol, phenyl ethyl alcohol, phenyl methyl carbinol and cinnamic alcohol are mentioned as examples;

Hydroxy or phenolic alcohols and aldehydes, such as o-hydroxy benzyl alcohol, anisyl alcohol, vanillyl alcohol, coniferyl alcohol, o-hydroxy benzaldehyde, 3,4 dihydroxy-benzaldehyde and vanillin. Quinones, quinone monoxime and dioxime;

Aromatic acids containing an OH group as the sulpho- and hydroxy saturated and unsaturated acids are useful as the sulpho-benzoic acids, hydroxy salicylic, the hydroxy benzoic acids, mandelic acid, tropic acid, and polyhydroxyphenolic acids as protocatechuic acid. Hydroxy polybasic acids as 2,5 dihydroxy-terephthalic and succinylosuccinic acids are also useful;

Aromatic compounds containing two or more benzene nuclei and having one or more hydroxyls are included. As examples are mentioned benzidine sulphonic acids as benzidine monosulphonic acid and benzidine disulphonic acid, hydroxydiphenyls as the dihydroxy diphenyls. Diphenyl methane derivatives as benzhydrol and diphenyl glycollic acid are included;

Derivatives of dibenzyl, the hydrobenzoins benzoin and benzilic acid are included;

Derivatives of triphenyl methane are included as trinitro-triphenyl carbinol, tri-phenyl carbinol, para-rosaniline and trihydroxy tri-phenylmethanes, the aurines;

Compounds derived from condensed benzene nuclei, as naphthalene and anthracene, are included, those which contain one or more hydroxyls or are derivatives of sulphurous acid. The two naphthols and the naphthalene sulfonic acids, and derivatives and substitution products of these as amino naphthols and amino naphthol sulfonic acid, hydroxy naphthoic acids, as hydroxy naphthoic acid, hydroxy anthracenes, sulphonic acids of anthracene, the several isomeric hydroxy-anthraquinones including quinizarine, et cetera, are useful, as are like phenanthrenes as phenanthrol and phenanthrenequinol;

Under heterocyclic compounds are mentioned the alcohols of the furanes, thiophene, furance and pyrrole, and derivatives thereof as hydroxy thiotolene as well as hydroxy compounds formed by condensation of a benzene nucleus with a furane, thiophene or pyrrole ring as coumarone, benzothiophene and indole and derivatives and substituted compounds thereof;

Suitable hydroxy containing members of the pyrazole and thiozole groups and sulfonated members thereof can be used;

Pyridine and its homologues provide sources of suitable hydroxy compounds, the hydroxy pyridines and of which pyridine itself forms three. Similarly, hydroxy compounds broadly considered as formed by condensation of a benzene nucleus and a heterocyclic six membered ring such as 3-hydroxy flavone, chrysin, luteolin, quercitin, myricetin, rhamnetin and rhamnazin. Quinolines as 1-hydroxy quinoline and other hydroxyl containing condensed benzene-pyridine nuclei are useful.

The products specified under mixtures set forth in Examples 1, 2, 3, 4 and 5 are, however, preferred.

I claim:

1. The process of manufacturing a new composition of matter consisting of reacting an anhydrous mixture of alcohol and a base in carbon disulfide with ammonium hydroxide, the ammonium hydroxide and the base being in less than molecular proportions with respect to the alcohol, followed by spraying the liquid product on a water soluble metallic salt in solid anhydrous state while said anhydrous salt is being mixed in a mixing device.

2. The process of manufacturing a new composition of matter comprising spraying a mixture of a metallic ammonium alkyl xanthate with one of the compounds selected from the group consisting of dithiocarbamates, liquid lime sulphur, 2-mercaptobenzothiazole, diaminodiphenylamine and thiuram disulphide upon an essentially anhydrous water soluble metallic salt while said anhydrous salt is being mixed in a mixing device.

References Cited in the file of this patent

UNITED STATES PATENTS

| | | |
|---|---|---|
| 2,150,759 | Carter | Mar. 14, 1939 |
| 2,173,384 | Carter | Sept. 19, 1939 |
| 2,317,765 | Hester | Apr. 27, 1943 |
| 2,406,960 | Neal et al. | Sept. 3, 1946 |
| 2,444,660 | Mathes | July 6, 1948 |

OTHER REFERENCES

Casolari Gazz. Chem. Ital., vol. 40, pt. II, pp. 389–402 (pp. 396–401 relied on), 1910.

Chem. Abstracts, vol. 11, p. 1631 (1917).